United States Patent
Veyry et al.

(10) Patent No.: US 12,056,110 B2
(45) Date of Patent: Aug. 6, 2024

(54) MANAGING SUBSCRIPTIONS TO DATA QUERIES THAT REACT AND UPDATE TO CHANGE NOTIFICATIONS

(71) Applicant: Arista Networks, Inc., Santa Clara, CA (US)

(72) Inventors: Pierre-Alexandre Rene Veyry, Dublin (IE); Aran Sean Liam Nolan, Wicklow (IE); Vlad Serban Hanciuta, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 156 days.

(21) Appl. No.: 17/828,536

(22) Filed: May 31, 2022

(65) Prior Publication Data
US 2023/0385264 A1 Nov. 30, 2023

(51) Int. Cl.
*G06F 16/00* (2019.01)
*G06F 16/23* (2019.01)
*G06F 16/2458* (2019.01)
*G06F 16/27* (2019.01)

(52) U.S. Cl.
CPC ...... *G06F 16/2358* (2019.01); *G06F 16/2477* (2019.01); *G06F 16/27* (2019.01)

(58) Field of Classification Search
CPC ... G06F 16/2358; G06F 16/2477; G06F 16/27
See application file for complete search history.

(56) References Cited

U.S. PATENT DOCUMENTS

| 10,284,417 | B2 | 5/2019 | Duda | |
|---|---|---|---|---|
| 10,693,705 | B2 | 6/2020 | Duda | |
| 2016/0306871 | A1* | 10/2016 | Chauhan | G06F 16/2477 |
| 2016/0357823 | A1* | 12/2016 | Chimalamarri | G06F 16/9535 |
| 2017/0344596 | A1* | 11/2017 | Fuller | G06F 16/2358 |
| 2021/0406288 | A1* | 12/2021 | Wright | G06N 20/00 |

OTHER PUBLICATIONS

"What is Prometheus?", retrieved at https://prometheus.io/docs/introduction/overview/ on May 31, 2022, 2022 The Linux Foundation. (5 pages).

* cited by examiner

*Primary Examiner* — Alexander Khong
(74) *Attorney, Agent, or Firm* — Fountainhead Law Group, PC (57) ABSTRACT

A method for managing streams includes obtaining, by a state processing module in a coordination point, a notification for a standing query, and in response to the notification: identifying a storage location in the coordination point associated with a stream of the standing query, initiating a subscription to the standing query using the storage location, reserving a data buffer for the standing query, replicating, based on the standing query, data of the data stream using the storage location, updating the data buffer using the replicated data or a reference to the replicated data to obtain an updated data buffer, and servicing the standing query using the updated data buffer.

20 Claims, 9 Drawing Sheets

MANAGING SUBSCRIPTIONS TO DATA QUERIES THAT REACT AND UPDATE TO CHANGE NOTIFICATIONS

BACKGROUND

During operation of a network that includes any number of network devices through which network traffic passes, a coordination point (e.g., a cloud service) may have the capability to obtain network state information for one or more of the network devices. The network device state information may be, for example, streamed to the coordination point.

Query languages may provide the ability for an entity (e.g., an administrative system) to send queries to the coordination point that specify, for example, obtaining data corresponding to the streamed data. The queries may be, for example, standing queries. The standing queries may specify obtaining data over a period of time (or indefinitely). However, the query languages may not be equipped to be updated when a change to an incoming stream occurs or is detected.

DETAILED DESCRIPTION

In general, embodiments disclosed herein include managing subscriptions of storage locations that streamed data to a coordination point (e.g., a network controller). Managing the subscriptions may include obtaining, by a state processing module of the coordination point, notifications for either: (i) a new standing query, or (ii) a change in a data stream. The notifications may be processed based on the type of notification.

For notifications that specify a new standing query, the storage locations for the specified data streams(s) are identified and stored in the coordination point. A storage location may be, for example, the location (e.g., in a database) to which the data of the data stream is being streamed (and ultimately stored). The database may be managed by the coordination point. A new subscription is generated for each of the specified data streams, and a storage location is stored for each subscription. A data buffer is reserved for the standing query on the state processing module and mapped to the subscription(s). The data buffer may be a portion of memory and/or persistent storage that stores locally (e.g., easily accessible to the state processing module) a copy of the data (or a reference to a copy of data) associated with the corresponding standing query. The data buffer may be updated based on future notifications for changes in the data stream.

The storage locations in a coordination point state database that are associated with one or more of the standing queries are monitored for any changes to their content. When the content changes (e.g., when a new data point is obtained, etc.), the state processing module may identify the standing queries that are utilizing the storage locations and re-evaluate the standing query following an identification of the update. To enable the aforementioned functionality a data structure may be generated and stored in, for example, memory accessible to the state processing module. The generated data structure may map each storage location to one or more standing queries. The re-evaluation may include identifying, using the generated data structure, all standing queries that utilize the data stream, updating the corresponding data buffers in the state processing module, and re-executing the query using the updated data buffer. The output of the re-execution may be provided to an output handler that manages communication with the entity (e.g., a client device used by an administrator) associated with the standing query. The process of updating the corresponding data buffers in the state processing module and re-executing the standing query using the updated data buffer may be repeated for each standing query utilizing the changed data stream.

Embodiments disclosed herein may enable efficient operation of a network that includes multiple network devices that stream their state information to a coordination point. A system in accordance with one or more embodiments disclosed herein enables the efficient servicing of standing queries of client devices by monitoring a coordination point state database for any change notifications that specify a change to a stream. The coordination point may service standing queries associated with multiple streams without requiring copying of all of the data after every change. This may be achieved by using data buffers that are generated on a per-standing query basis. The use of the per-standing query data buffers provides an efficient mechanism to process newly received state information.

Embodiments disclosed herein further enable the efficient servicing of new standing queries by generating such data buffers in accordance with the requested stream and a requested time window. The data buffers may be updated based on the new state information, thus reducing the amount of data copied on a per-change notification basis.

Moreover, the system, in accordance with embodiments disclosed herein, is scalable such that it may be used in conjunction with networks of any size without negatively impacting the time required to process standing queries.

The following describes various embodiments of the technology.

Figure 1:
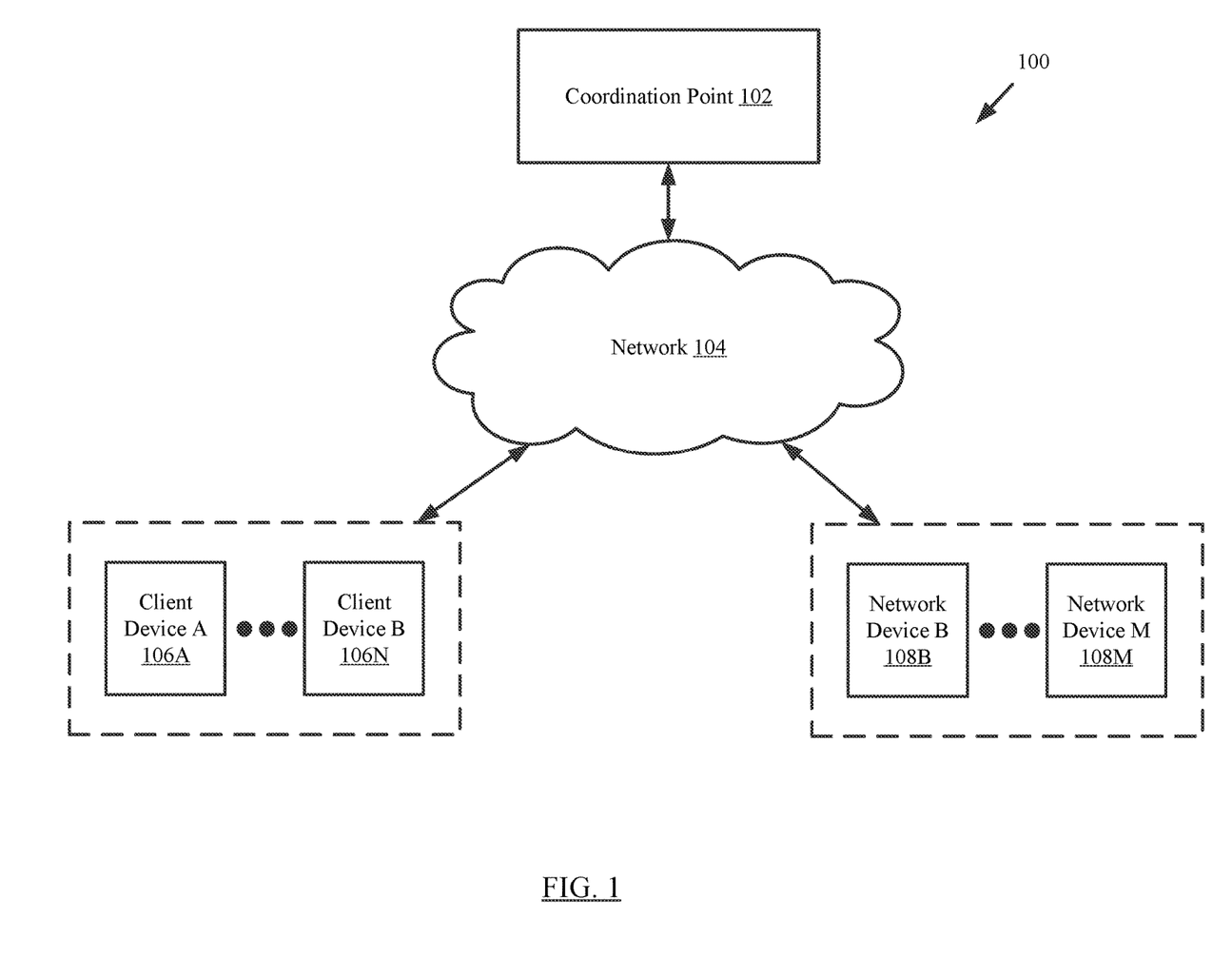
FIG. 1 shows a system in accordance with one or more embodiments.

FIG. 1 shows a system in accordance with one or more embodiments disclosed herein. The system (100) includes a coordination point (102) connected to one or more client device(s) (106A, 106N) and one or more network device(s) (108B, 108M) through a network (104). Each of these components is described below.

In one or more embodiments disclosed herein, the coordination point (102) is a computing device that manages a set of network devices (e.g., 108B, 108M). In one or more embodiments disclosed herein, a computing device is any physical or virtual device that may be used for performing various embodiments. The physical device may correspond to any physical system (see e.g., FIG. 8) with functionality to implement one or more embodiments disclosed herein.

For example, the physical device may be a server (i.e., a device with at least one or more processor(s), memory, and an operating system) that is connected to at least one client device (e.g., 106A, 106N) and at least one network device (e.g., 108B, 108M).

Alternatively, the physical device may be a special purpose computing device that includes one or more application-specific processor(s) (or hardware) configured to only execute embodiments disclosed herein. In such cases, the physical device may implement embodiments disclosed herein in hardware as a family of circuits and may retain limited functionality to receive input and generate output in accordance with various embodiments disclosed herein. In addition, such computing devices may use a state-machine to implement various embodiments disclosed herein.

In another embodiment, the physical device may correspond to a computing device that includes one or more general purpose processor(s) and one or more application-specific processor(s) (or hardware). In such cases, one or more portions disclosed herein may be implemented using the operating system and general purpose processor(s), while one or more portions disclosed herein may be implemented using the application-specific processor(s) (or hardware).

In one or more embodiments, the coordination point (102) may correspond to a virtual machine or a container. Virtual machines are distinct operating environments configured to inherit underlying functionality of the host operating system (and access to the underlying host hardware) via an abstraction layer. In one or more embodiments disclosed herein, a virtual machine includes a separate instance of an operating system, which is distinct from the host operating system. Containers are isolated user space instances that execute on a common operating system.

In one or more embodiments, the coordination point (102) may be implemented in a virtual machine executing on a network device. In another embodiment disclosed herein, the coordination point may be implemented in a virtual machine executing on a server that is connected to one or more client device(s) (e.g., 106A, 106N in FIG. 1) and/or one or more network device(s).

In one or more embodiments, the coordination point (102) includes executable instructions (stored in a non-transitory computer readable medium (not shown)), which when executed, enable the coordination point to perform the methods described below (see e.g., FIGS. 5 and 6). Additional detail about the coordination point is described below with respect to FIG. 3.

In one or more embodiments, the one or more client device(s) (106A, 106N) may each be a physical or virtual computing device (discussed above) that is configured to interact with the coordination point (102). For example, a physical client device (see e.g., FIG. 8) may be a desktop computer operated by a network administrator, whereas a virtual client device may be a virtual machine executing on a server. In one or more embodiments disclosed herein, a client device includes functionality to transmit a standing query(ies) to the coordination point related to a stream(s) (discussed below) of state information provided to the coordination point (102) by one or more of the network devices (108B, 108M). The client devices (106A, 106N) further include functionality to obtain a response from the coordination point (102) based on servicing of the standing query(ies).

In one or more embodiments, the one or more network device(s) (108B, 108M) are physical devices that include persistent storage, memory (e.g., random access memory), one or more processor(s) (including a switch chip), and two or more physical ports. In one or more embodiments disclosed herein, the switch chip is hardware that determines which egress port on a network device to forward media access control (MAC) frames. The switch chip may include egress and ingress ports that may connect to ports on the network device. Each port may or may not be connected to another device on a network device on the network (104) (e.g., a server, a switch, a router, etc.). The network device may be configured to receive packets via the ports and determine whether to: (i) drop the packet; (ii) process the packet in accordance with one or more embodiments disclosed herein; and/or (iii) send the packet, based on the processing, out another port on the network device.

How the network device makes the determination of whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (e.g., which was written by the last device to send the packet) in the L2 information encapsulating the packet. If the network device is a multilayer switch, the multilayer switch includes functionality to process packets using both MAC addresses and IP addresses.

Figure 4:
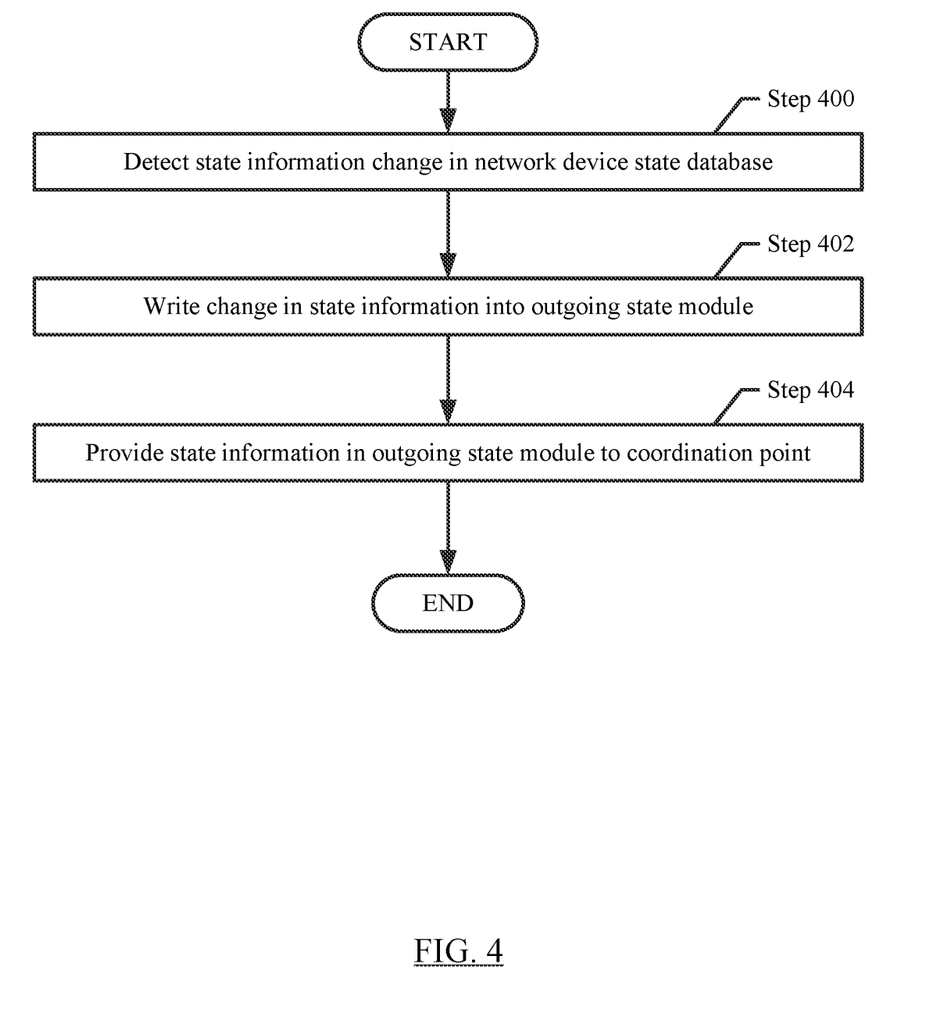
FIG. 4 shows a flowchart for sending state updates from a network device to a coordination point in accordance with one or more embodiments.
Figure 5:
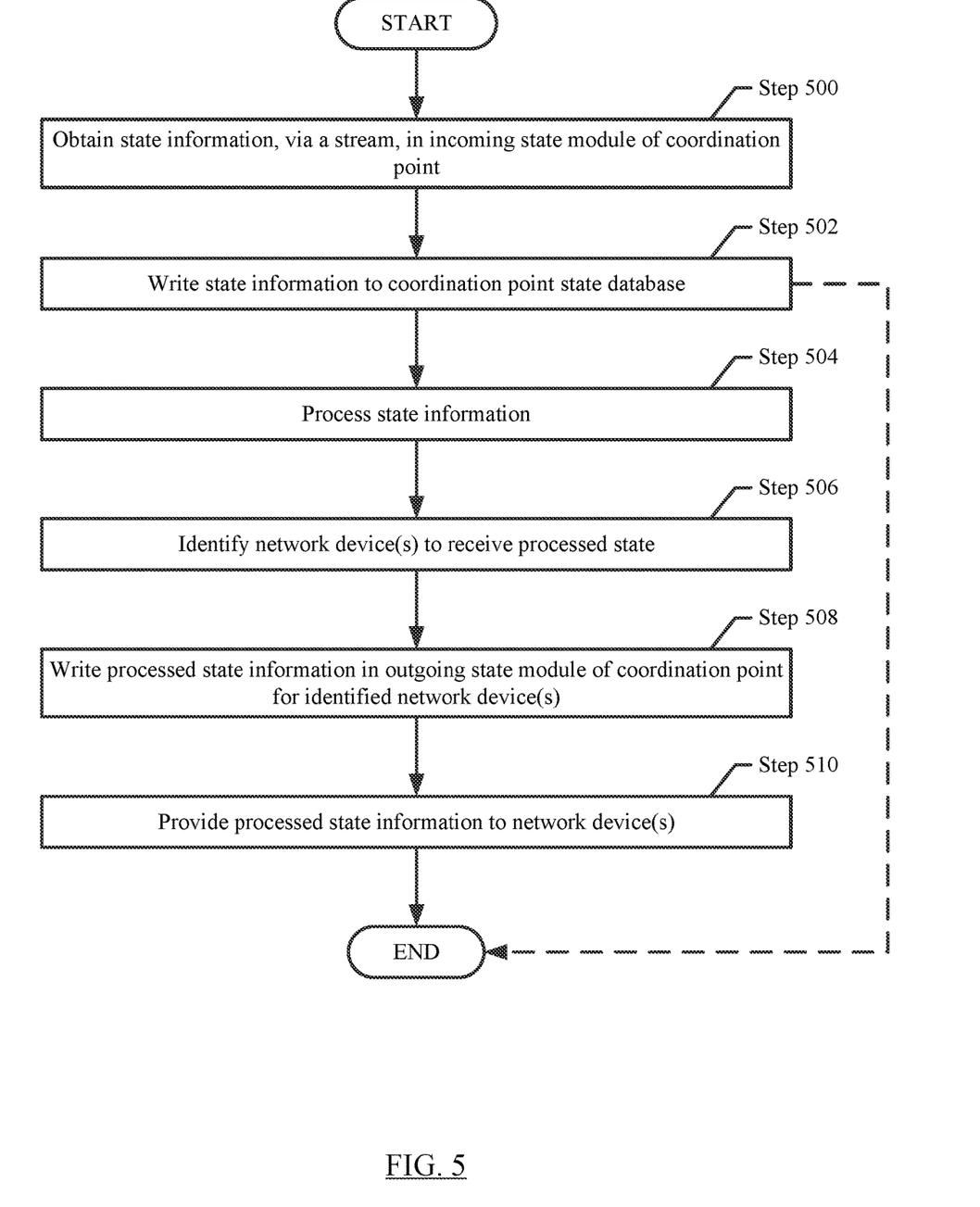
FIG. 5 shows a flowchart for processing state updates by a coordination point in accordance with one or more embodiments.
Figure 6:
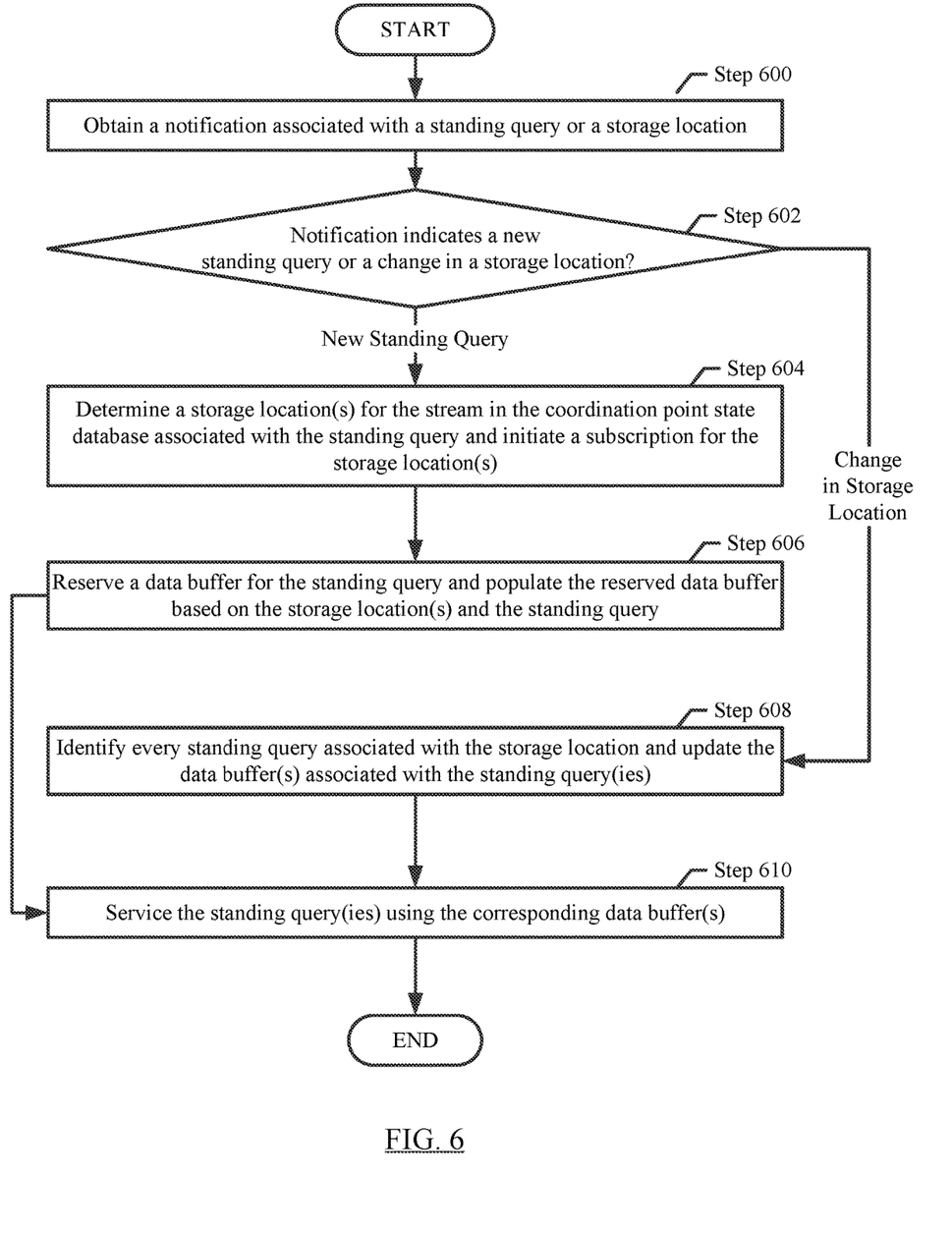
FIG. 6 shows a flowchart for receiving and processing notifications in accordance with one or more embodiments.

In one or more embodiments, the persistent storage in the network device may include any type of non-transitory computer readable medium that includes instructions, which, when executed by one or more processor(s) in the network device, enable the network device to perform functions described in accordance with one or more embodiments disclosed herein (see e.g., FIGS. 4-6).

Examples of network devices include, but are not limited to, a router, a switch, and a multilayer switch. The network device is not limited to the aforementioned specific examples. Additional detail about a network device is described below with respect to FIG. 2.

In one or more embodiments, the network (104) may be the medium through which the coordination point (102), the one or more client device(s) (106A, 106N), and the one or more network device(s) (108B, 108M) are connected. In one or more embodiments disclosed herein, the network may include other network devices (or systems) (not shown) that facilitate communication between the aforementioned components. As such, in one or more embodiments disclosed herein, the network may include any combination of local and/or wide area (e.g., Internet) network segments that may be wire-based and/or wireless and that may use any combination of wired and/or wireless communication protocols.

The technology is not limited to the system shown in FIG. 1. More specifically, while the system shown in FIG. 1 includes a single coordination point, embodiments disclosed herein may be implemented using multiple coordination points, where the multiple coordination points are configured such that if one of the multiple coordination points fails, the other coordination points may continue to operate and provide the functionality described below (see e.g., FIGS. 4-6) to the client devices (106A, 106N) and the network devices (108B, 108M).

Figure 2:
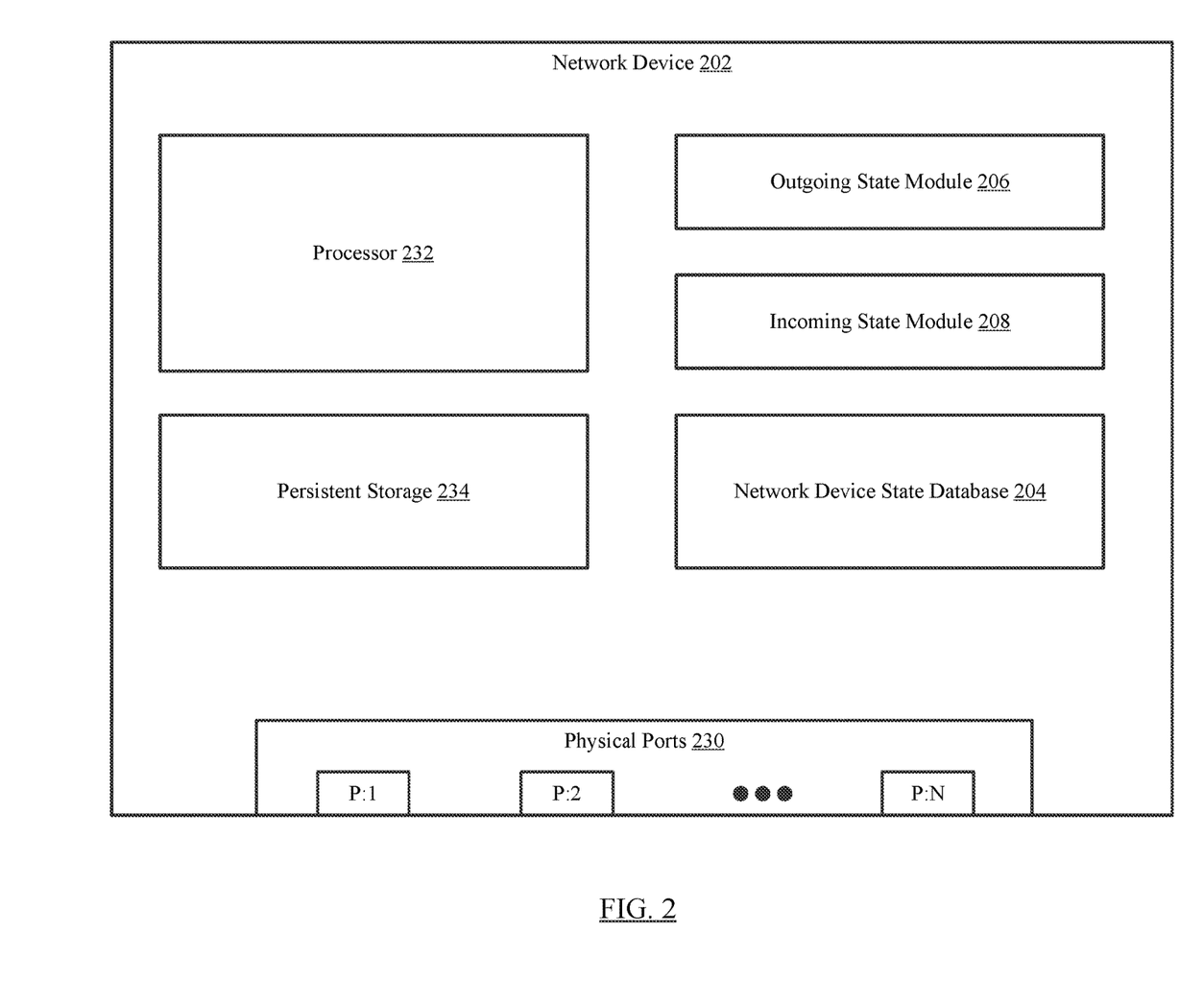
FIG. 2 shows a network device in accordance with one or more embodiments.

FIG. 2 shows a network device in accordance with one or more embodiments disclosed herein. In one or more embodiments disclosed herein, a network device (202) is a physical device that includes persistent storage (234), memory (e.g., Random Access Memory, or any other volatile (or non-persistent) memory), one or more processors (232) (including, e.g., a switch chip), and two or more physical ports (230). In one or more embodiments disclosed herein, the switch chip is hardware that determines to which egress port on a switch to forward media access control (MAC) frames. The switch chip may include egress and ingress ports that may connect to ports on the switch. Each port may or may not be connected to another device on a network (e.g., a server, a switch, a router, etc.). The network device may be configured to receive packets via the ports and determine whether to (i) drop the packet, (ii) process the packet in accordance with one or more embodiments disclosed herein, and/or (iii) send the packet, based on the processing, out another port on the network device.

In one or more embodiments disclosed herein, the persistent storage (234) in the network device may include any type of non-transitory computer readable medium that includes instructions, which, when executed by one or more processors in the network device, enable the network to perform the functions described in accordance with one or more embodiments disclosed herein (see e.g., FIG. 4).

In one or more embodiments disclosed herein, the functionality of the network device may be logically divided into a control plane and data plane (not shown). The data plane includes functionality to receive packets (denoted as ingress packets) via ports (230), process the packets (as described above) and, as appropriate, transmit packets (denoted as egress packets) via the ports towards a destination.

In one or more embodiments, the control plane includes functionality to manage the overall operation of the network device. More specifically, the control plane includes functionality to manage the operation of the data plane. The control plane may also include functionality to gather and send state information to the coordination point (see FIG. 4). In addition, the control plane may also include functionality to receive state information from the coordination point (see e.g., FIG. 5, step 510) and process the received state information.

Examples of network devices include, but are not limited to, a router, a switch, and a multilayer switch. The network device is not limited to the aforementioned specific examples.

In one or more embodiments disclosed herein, the network device state database (204) in the network device (202) includes the current state of the network device. The state information that is stored in the network device state database (204) may include, but is not limited to: (i) information about services currently executing on the network device; (ii) the versions of software executing on the network device; (iii) the versions of firmware on the network device; (iv) hardware version information for hardware in the network device; (v) information about the current state of tables (e.g., routing table, forwarding table, etc.) in the network device that are used to process packets (described below), where the information may include the current entries in each of the tables; and (vi) information about each of the services/protocols/features configured on the network device (e.g., MLAG, LACP, VXLAN, LLDP, Tap Aggregation, Data Center Bridging Capability Exchange, ACL, VLAN, VRRP, VARP, STP, OSPF, BGP, RIP, BDF, MPLS, PIM, ICMP, IGMP, etc.), where this information may include information about the current configuration and status of each of the services/protocols/features). The network device state database (204) may include other information without departing from the technology.

In one or more embodiments disclosed herein, the network device state database (204) may be implemented using any type of database (e.g., a relational database, a distributed database, etc.) Further, the network device state database (204) may be implemented in-memory (i.e., the contents of the network device state database (204) may be maintained in volatile memory). Alternatively, the network device state database (204) may be implemented using persistent storage. In another embodiment disclosed herein, the network device state database (204) is implemented as an in-memory database with a copy of the network device state database (204) being stored in persistent storage. In such cases, as changes are made to the in-memory database, copies of the changes (with a timestamp) may be stored in persistent storage. The use of an in-memory database may provide faster access to the contents of the network device state database (204).

Those skilled in the art will appreciate that while the term "database" is used above, the network device state database (204) may be implemented using any known or later developed data structure(s) to manage and/or organize the content in the network device state database (204).

In one or more embodiments disclosed herein, the network device state database (204) may be updated by the network device (or by a process executing thereon). The updates may be generated internally by the network device (or by a process executing thereon) or by state information received by the incoming state module (208). In one or more embodiments disclosed herein, the outgoing state module (206) includes a process that monitors the network device state database (204) and identifies updated state information to be sent to the coordination point (see e.g., FIG. 3). If the updated state information is to be sent to the coordination point, then the outgoing state module (206) includes functionality to transmit (or otherwise provide) the updated state information to the coordination point.

In one or more embodiments disclosed herein, when a network device initially establishes a connection (or session) with the coordination point, the network device may provide the coordination point with all (or a portion) of the state information maintained in the network device state database (204). The coordination point includes functionality to receive this information. The received information is then used as part of the processing in FIG. 5 (described below).

Figure 3:
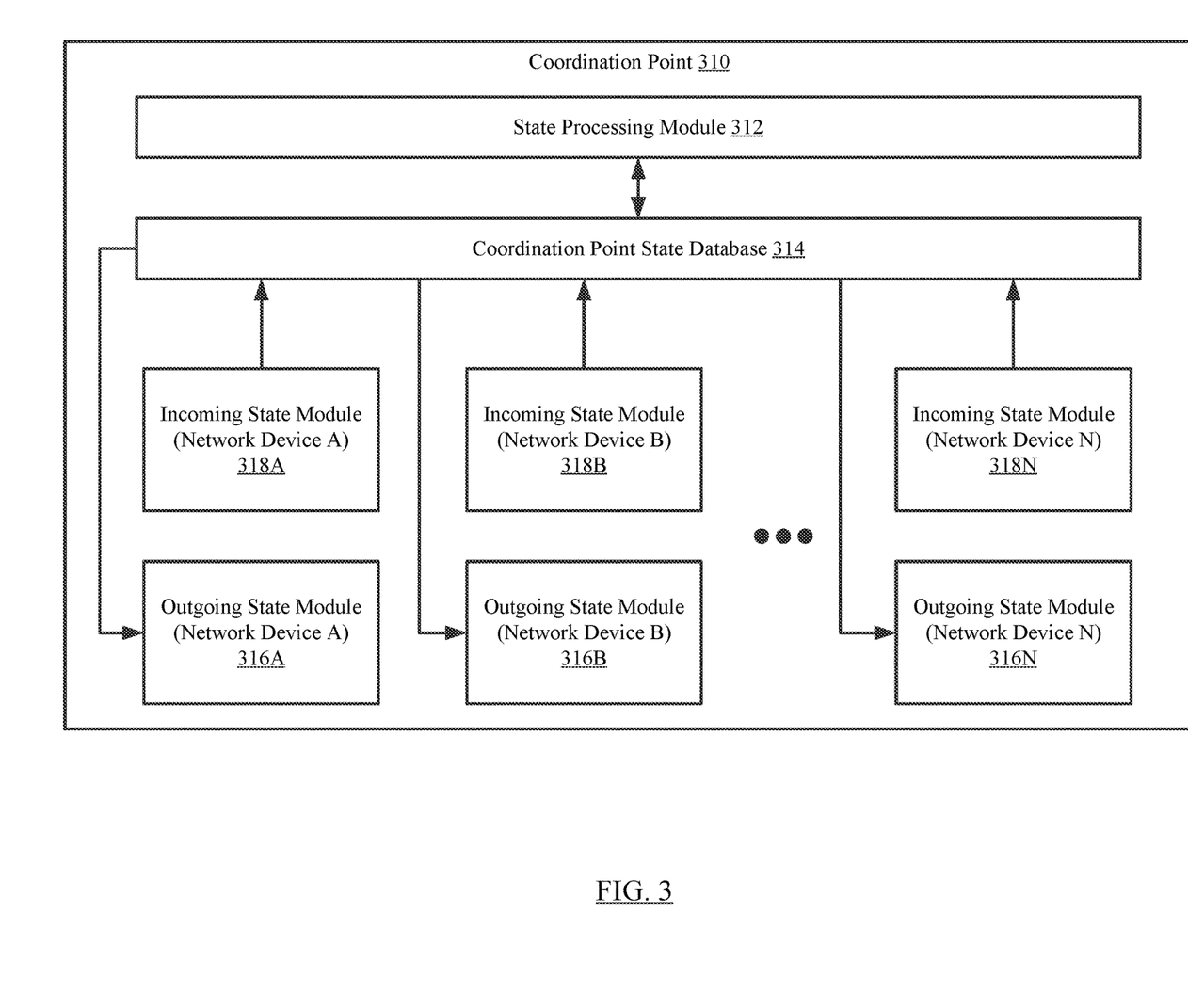
FIG. 3 shows a coordination point in accordance with one or more embodiments.

FIG. 3 shows a coordination point in accordance with one or more embodiments disclosed herein. The coordination point (310) includes a coordination point state database (314), a state processing module (312), one or more incoming state modules (318A, 318B, 318N), and one or more outgoing state modules (316A, 316B, 316N). Each of these components is described below.

In one or more embodiments disclosed herein, coordination point state database (314) includes a state of each of the network devices for which it is acting as the coordination point (310). The state of each of the network devices, stored in the coordination point state database, may include, but is not limited to: (i) the state information that has been provided to the coordination point by the network devices (see e.g., FIG. 4) and (ii) the state information obtained from other network devices (or generated by the coordination point or received from another entity connected to the coordination point) that is being sent to (or is scheduled to be sent to) the network device (see e.g., FIG. 5). Accordingly, the state of a network device and the state of the network device maintained in the coordination point state database (314) may be different. The aforementioned differences may be the result of state changes that have been made on the network device that have not been propagated to the coordination point and/or state changes that are scheduled to be sent to the network device but have not been sent.

In one or more embodiments, the coordination point state database (314) may be implemented using any type of database (e.g., a relational database, a distributed database, etc.). Further, the coordination point state database (314) may be implemented in-memory (e.g., the contents of the coordination point state database (314) may be maintained in volatile memory). Alternatively, the coordination point state database (314) may be implemented using persistent storage. In another embodiment disclosed herein, the coordination point state database (314) is implemented as an in-memory database with a copy of the coordination point state database (314) being stored in persistent storage. In such a case, as changes are made to the in-memory database, copies of the changes (with a timestamp) may be stored in persistent storage. A history of the encountered states may thus be established. The use of an in-memory database may provide faster access to the contents of the coordination point state database (314).

Those skilled in the art will appreciate that while the term "database" is used above, the coordination point state database (314) may be implemented using any known or later developed data structure(s) to manage and/or organize the content in the coordination point state database (314).

In one or more embodiments disclosed herein, the state information of the network device(s) that is stored in the coordination point state database (314) may include, but is not limited to: (i) information about services currently executing on the network device; (ii) the versions of software executing on the network device; (iii) the versions of firmware on the network device; (iv) hardware version information for hardware in the network device; (v) information about the current state of tables (e.g., routing table, forwarding table, etc.) in the network device that are used to process packets (described below), where the information may include the current entries in each of the tables; and (vi) information about each of the services/protocols/features configured on the network device (e.g., MLAG, LACP, VXLAN, LLDP, Tap Aggregation, Data Center Bridging Capability Exchange, ACL, VLAN, VRRP, VARP, STP, OSPF, BGP, RIP, BDF, MPLS, PIM, ICMP, IGMP, etc.), where this information may include information about the current configuration and status of each of the services/protocols/features). The network device state database (204) may include other information without departing from the technology.

In one or more embodiments disclosed herein, the coordination point state database (314) is a distributed database that may span one or more data centers or locations and for which state synchronization may be available.

Continuing with the discussion of coordination point (310), the state processing module (312) includes functionality to: (i) determine what state information has been received from each of the network devices; (ii) process the received state information; and (iii) determine to which network devices (if any) to send out the processed state information (see e.g., examples discussed below). The state processing module (312) also includes functionality to perform all or a portion of the methods described in FIGS. 5-6.

While the state processing module (312) is represented as a single module, the state processing module (312) may be implemented as a set of state processing modules. In some embodiments, each of these state processing modules includes functionality to process certain types of state information. For example, there may be one state processing module that manages the coordination of all state information related to VXLAN and there may be another state processing module that handles all state information related to the Border Gateway Protocol (BGP). These examples are not intended to limit the scope disclosed herein.

In one or more embodiments disclosed herein, the state information received from each of the network devices is received via a network device-specific incoming state module (318A, 318B, 318N). The incoming state module may be implemented as a data structure that is specific to the network device (e.g., there is one instance of the data structure for each network device). In another embodiment disclosed herein, there may be a single incoming state module that receives the state information from all network devices. Regardless of the implementation, one example of a data structure that may be used is a First In First Out (FIFO) queue. Other data structures may be used without departing from the technology.

In one or more embodiments disclosed herein, the state information to be sent to specific network devices may be stored in a network device-specific outgoing state module (316A, 316B, 316N). The outgoing state module may be implemented as a data structure that is specific to the network device (e.g., there is one instance of the data structure for each network device). In another embodiment disclosed herein, there may be a single outgoing state module that temporarily stores outgoing state information for all network devices (e.g., 1008B, 108M, FIG. 1). Regardless of the implementation, one example of a data structure that may be used is a FIFO queue. Other data structures may be used without departing from the technology.

In one or more embodiments disclosed herein, the state information from the individual network devices is shared with the coordination point using an asynchronous replication mechanism. More specifically, when state information is changed in the network device, the changed state information is first stored in the network device state database (FIG. 2, 204) and then a copy of the changed state information is transmitted to the coordination point.

In one or more embodiments disclosed herein, the state information in the coordination point is shared with the individual network devices using an asynchronous replication mechanism. More specifically, when state information is changed in the coordination point, the changed state information is first stored in the coordination point state database (FIG. 1, 102) and then a copy of the changed state information is transmitted to the individual network devices.

One skilled in the art will recognize that the architecture of a network device, the coordination point and of the network is not limited to the components shown in FIGS. 1-3. For example, the network may include any number and any type of network devices participating in the sharing of states. Further the network devices and the coordination point may include components not shown in FIGS. 1-3, e.g., network chips, fabric, line cards, etc. In addition, the coordination point may support an arbitrary number of network devices participating in the sharing of states, and the coordination point may further support different types of state processing modules resulting in different state sharing behaviors and/or the coordination point may support multiple state processing modules executing simultaneously, as further described in detail below. Further, though not shown in FIG. 3, the coordination point may include one or more data buffers, which are used to implement all or portion of the methods shown in FIG. 5-6. The data buffers may be located in persistent and/or memory accessible by the state processing module. For example, the data buffers may be located in memory within the coordination point. Additional detail about the data buffers is provided below.

FIG. 4 shows a method for sending state updates from a network device to a coordination point in accordance with one or more embodiments disclosed herein. The method of FIG. 4 may be performed by, for example, a network device (e.g., 108A, FIG. 1). Other components illustrated in FIG. 1 may perform the method of FIG. 4 without departing from the disclosure. Further, one or more steps in FIG. 4 may be performed concurrently with one or more steps in FIGS. 5-6.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 400, a change in the state information in the network device state database is detected. The change may be detected by the outgoing state module on the network device (e.g., 206 in FIG. 2) or another process executing on the network device. The change may correspond to a change in any value in the network device state database. Examples of changes in the state information may include, but are not limited to, a new entry is added to a forwarding table, an entry is deleted from a forwarding table, a new protocol is being implemented on the network device, and the status of a service on the network device has changed (e.g., from active to in-active).

In step 402, the network device writes the detected changed state information to the outgoing state module of the network device. The writing of the detected changed state information may be event-triggered, e.g., the network device may write the detected changed state information to the outgoing state module once the detection occurs in step 400. The state information written to the outgoing state module may include a timestamp, which may be used in the processing described in FIG. 5. In one embodiment, the detected state change may be written to a FIFO queue associated with the outgoing state module.

In step 404, the network device sends the state information in the outgoing state module of the network device to the coordination point. The sending of the state information may be event-triggered, e.g., the network device may send the state information to the coordination point once the state has been written to the outgoing state module in step 402. Alternatively, the state information may be queued in the outgoing state module and then sent when a threshold amount of state information is stored in the outgoing state module. The network device may use any type of communication protocol in order to transmit the state information to the coordination point, including, for example link layer, internet layer, transport layer, and application layer protocols that may further include proprietary protocols specifically designed for the sharing of configuration information. After having sent the state information to the coordination point, the network device may delete the state information from the outgoing state module.

In one or more embodiments, the state information is transmitted via a stream. In one or more embodiments, a stream is an indefinite stream (e.g., a stream without a predefined end), or otherwise continuous, transmission of data from a source to a destination. The stream may include packets that specify the state information (as discussed above) and a timestamp. The packets may be transmitted as part of the stream at any point in time. For example, the packets may be sent periodically at predetermined points in time. Alternatively, the state information may be sent at points in time based on the detection of changes to the state information as discussed throughout FIG. 4. In other embodiments, the packets are transmitted periodically in response to requests by the coordination point for obtaining the state information. The outgoing state module may concurrently implement two or more of the aforementioned mechanisms (e.g., periodically, based on the detection of changes, or in response to requests by the coordination point) without departing from the technology.

FIG. 5 shows a method for processing state information updates received by a coordination point in accordance with one or more embodiments disclosed herein. The method of FIG. 5 may be performed by, for example, a coordination point (e.g., 102, FIG. 1). Other components illustrated in FIG. 1 may perform the method of FIG. 5 without departing from the disclosure. Further, one or more steps in FIG. 5 may be performed concurrently with one or more steps in FIGS. 4 and 6.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 5, in step 500 the coordination point receives state information from a network device participating in the sharing of state information (e.g., from a network device that performed the method shown in FIG. 4). The state information may be received in the form of a stream (as discussed above). In one or more embodiments disclosed herein, the coordination point stores the state information in the incoming state module corresponding to the network device that sent the state information. The receipt of state information triggers the subsequent execution of steps 502-510 and, potentially, the method shown in FIG. 6 (see additional details below).

In step 502, the coordination point writes the state information received in the incoming state module to the coordination point state database. In one or more embodiments disclosed herein, the state information in the incoming state module may be used to update an already existing state information value in the coordination point state database. Alternatively, in one or more embodiments disclosed herein, the state information in the incoming state module may be new state information, i.e., state information not yet existing in the coordination point state database. In this case, the received state information may be added to the coordination point state database as new state information. The state information may subsequently be deleted from the incoming state module. The method of FIG. 5 may end following step 502, as steps 504-510 may be optional.

In step 504, the state processing module, e.g., in response to receiving state information, may process the state information. The processing may include obtaining the updated state information (i.e., the updated state information received in step 500) along with other state information that is currently stored in the coordination point state database. The processing may further include, but is not limited to, any combination of the following: (i) generating new state information based on the obtained state information; (ii) modifying all or a portion of the obtained state information;

(iii) filtering the state information to obtain a subset of the state information; (iv) aggregating the state information to generate a new set of state information; and (v) applying one or more policies to the state information where the policies are used, at least in part, to determine how to process the obtained state information.

In step 506, in response to writing the results of the processing to the state database (i.e., written new state information, or modified or unmodified state information to the coordination point state database), the coordination point identifies zero, one or more recipient network device(s) of the new (or modified) state information. In one or more embodiments disclosed herein the recipient network devices are scenario specific and are determined by the configuration of the state processing module. Consider, for example, the scenario where the state information sharing is used for the dissemination of configuration parameters. In this scenario, the coordination point may disseminate the updated configuration parameters to all network devices participating in the sharing of state information. In contrast, consider another scenario where the state information sharing is used to share MAC addresses of elements of a VLAN with other network devices. In this scenario, the state information representing these MAC addresses would only be shared with network devices that serve the VLAN, but not with other network devices. In one or more embodiments disclosed herein, the state information may not be distributed to the network device from where the state information was received in step 400, and the network device from where the state information was received may therefore not be identified as a recipient network device.

In one or more embodiments, the aforementioned results are stored in multiple storage locations of the coordination point state database. For example, the coordination point state database may include multiple databases, and portions of the generated results may each be stored in one of the multiple databases, such that the generated results are distributed and stored across multiple storage locations. In other embodiments, all of the generated results are stored in one storage location.

In step 508, the coordination point writes the state information generated by the processing in step 504 to the outgoing state module of the coordination point. In one or more embodiments disclosed herein, in cases where multiple network devices are intended recipients of the state information, the state information may be written to multiple outgoing state modules, with an outgoing state module corresponding to each of the intended recipients.

In step 510, the coordination point sends the state information in the outgoing coordination point module(s) to the network device(s). The coordination point may use any type of communication protocol in order to transmit the state information to the network device, including, for example link layer, internet layer, transport layer, and application layer protocols that may further include proprietary protocols specifically designed for the sharing of configuration information. Subsequently, the state information may be deleted from the outgoing coordination point module.

FIG. 6 shows a flowchart for receiving and processing notifications by a coordination point in accordance with one or more embodiments disclosed herein. The method of FIG. 6 may be performed by, for example, a coordination point (e.g., 102, FIG. 1). Other components illustrated in FIG. 1 may perform the method of FIG. 6 without departing from the disclosure. Further, one or more steps in FIG. 6 may be performed concurrently with one or more steps in FIGS. 4-5.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 6, in step 600, a notification is obtained from a notification source. In one or more embodiments, the notification specifies one of the following: (i) a new standing query has been obtained, or (ii) new state information has been stored in the coordination point state database via a stream (also referred to as a change in a stream or a change notification). The notification source may be a client device (e.g., a client device requesting implementation of a new standing query). Further, the notification source may be, for example, an agent executing on the coordination point state database that issues the notification in response to detecting a change in the data in the storage locations to the state processing module. The notification source may be another entity without departing from the technology.

In scenarios in which the notification specifies a new standing query, this notification may be generated in response to the coordination point receiving a standing query from a client device or from another device connected to the coordination point. The standing query may specify performing a query processing on state information. The state information specified in the standing query may include one or more pieces of state information. Further, the standing query may specify a time window, where the time window specifies which subset of the state information is to be used when processing the standing query. For example, the time window may specify that only state information that is received in the last 15 minutes or last 24 hours is to be used to service the standing query. The query processing of the state information may include, for example, determining an average value for any numerical values (e.g., memory usage, storage capacity, etc.) associated with the state information. Further, the query processing may include determining a most frequent value for a parameter of the state information during the given time window. The aforementioned examples are not intended to limit the scope of the technology.

In one or more embodiments, the notification may be the result of detecting a change in a stream. The change in the stream may include new state information being written in a storage location of the coordination point state database that is associated with a stream. The coordination point database (or another process monitoring the coordination point database) may detect new data at storage locations in the coordination point database and issue change notifications based on the detection.

In step 602, a determination is made on the type of notification obtained in step 600. If the notification specifies a new standing query, the method proceeds to step 604; if the notification specifies a change notification for a change in a storage location (e.g., new data associated with one or more standing queries is stored in the storage location), the method proceeds to step 608.

In step 604, following the determination that the obtained notification specifies a new standing query, one or more storage locations for the stream in the coordination point state database is determined. In one or more embodiments, the storage location is obtained by identifying the state information specified in the standing query and consulting the coordination point state database to determine the storage location(s) of the state information. Further, in step 604, a subscription for the storage locations is initiated. In one or more embodiments, the subscription is a service for monitoring the storage location(s) to determine whether a data buffer (discussed below) of the standing query is to be updated based on a change to the storage location(s) (e.g., as determined in step 602).

In step 606, a data buffer is reserved for the standing query and populated with state information from the storage location(s) identified in step 604. The amount of state information that is stored in the data buffer may be based on the standing query (see, e.g., Example section below). In one or more embodiments, the data buffer is a portion of memory (e.g., internal or external to the coordination point state database) that stores a copy of data that is required to service the standing query. The aforementioned reservation of the data buffer creates an association between the standing query and the data buffer. By associating the subscriptions with the data buffer, whenever data (i.e., state information) associated with the subscription is written to a storage location, a copy of the data or a reference to the data is written to the associated data buffer (e.g., in accordance with step 608).

Continuing with the discussion of the data buffer, the size of the data buffer may be set by a user, be a default value and/or may be based on a time window specified in a standing query. More specifically, if a time window is specified, then the data buffer may be of a size that is based on the time window of the standing query and the amount of stored data for the stream that is within the specified time window. For example, if the time window specifies the most recent 24 hour period, the data buffer may be generated to store a copy of all entries of state information that specify a timestamp indicating being within the most recent 24 hour period. In this example, the size of the data buffer may be based on the size of each entry and the number of entries.

In one or more embodiments, the data stored in the data buffer may be obtained from multiple storage locations in the coordination point state database. For example, if the standing query requests data from multiple storage locations, then the data from each of the multiple storage locations are copied, and the copy is stored in the data buffer. In another example, if the standing query requests data from multiple storage locations, then a reference to the data from each of the multiple storage locations is stored in the data buffer.

Once the data buffer for the standing query has been reserved, the data buffer is populated with copies of the data (or references to data) stored at the storage location(s) that include data that is required to service the standing query.

In addition, a data structure is created and/or updated with a mapping between the new standing query, the identified storage location(s), and the data buffer. This data structure is used in step 608 discussed below.

The method may proceed to step 610 following step 606.

Returning back to step 602, following the determination of step 602 that the notification specifies a change in a storage location, in step 608 every standing query associated with the change in a storage location is identified. In one or more embodiments, the standing queries are identified using the data structure discussed in step 606. For example, the state processing module may perform a look-up in the data structure to determine which standing queries need to be executed (in response to new data being received at the storage location).

Step 608 is performed in scenarios in which there was a previously received standing query(ies) (i.e., at least steps 604 and 606 were performed) associated with the storage location. Thus, one or more subscriptions to the storage location were previously initiated. Because one or more subscriptions associated with the storage location were previously initiated, a copy of new data (or a reference to the new data) stored in the storage location is automatically replicated (or otherwise stored) in the one or more data buffers, where each data buffer corresponds to a separate standing query that required the data stored at the storage location. Thus, prior to step 608, the data buffers corresponding to the standing queries identified in step 608 are already updated with a copy of the new data (or a reference to the new data) from the storage location.

Further, in scenarios in which the standing query specifies a time window, the state processing module may also update the data buffer by removing any data that is associated with a timestamp that is outside of the time window of the corresponding standing query. For example, as the time window changes to be more recent, any data that has fallen outside of the changed time window may be deleted. In this manner, the data buffer continues to include data that is associated with the changed time window for its corresponding standing query. Similar updates may be performed for each data buffer of the corresponding identified standing queries.

In one or more embodiments, if the storage location is associated with multiple standing queries, one data buffer associated with one of these standing queries is updated with the updated data from the storage location, and a reference to the updated portion of the data buffer is stored in the other data buffers subscribed to the storage location. In this manner, only one copy of the updated data is stored between all of the data buffers that are subscribed to the storage location.

While the aforementioned discussion on Step 608 focuses on identifying one or more standing queries that are associated with the storage location that includes new data, if no standing queries are identified in step 608, then the process ends.

Continuing with the discussion of FIG. 6, in step 610, the standing query(ies) is serviced using the corresponding data buffer. In one or more embodiments, the standing query is serviced by performing the query processing on the corresponding data buffer as specified by the standing query and providing the result of the query processing to the client device associated with the standing query. If there are multiple standing queries identified in step 608, then the identified set of standing queries may be executed sequentially or in parallel.

The following section describes an example in accordance with one or more embodiments disclosed herein. The examples are not intended to limit the scope disclosed herein.

EXAMPLE

Figure 7A:
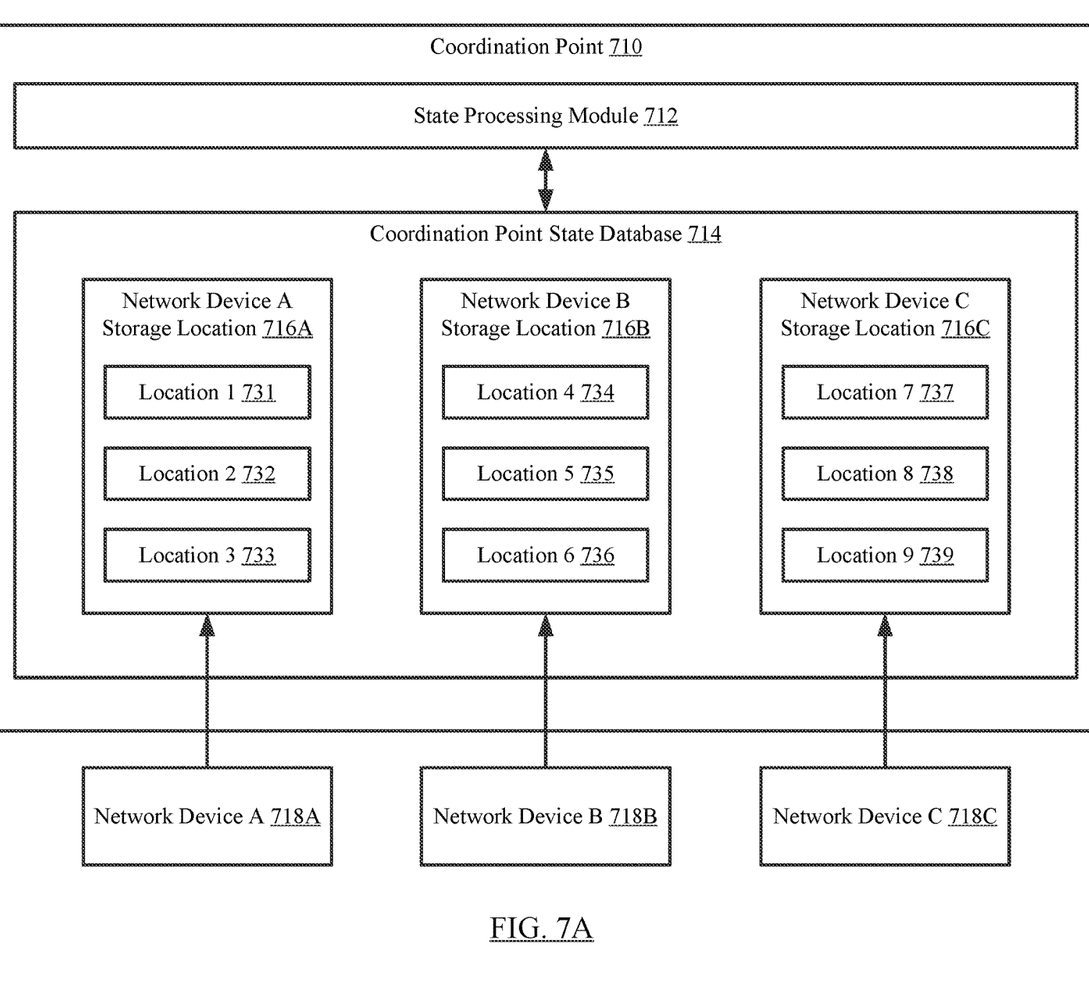
FIGS. 7A-7B shows an example in accordance with one or more embodiments disclosed herein.
Figure 7B:
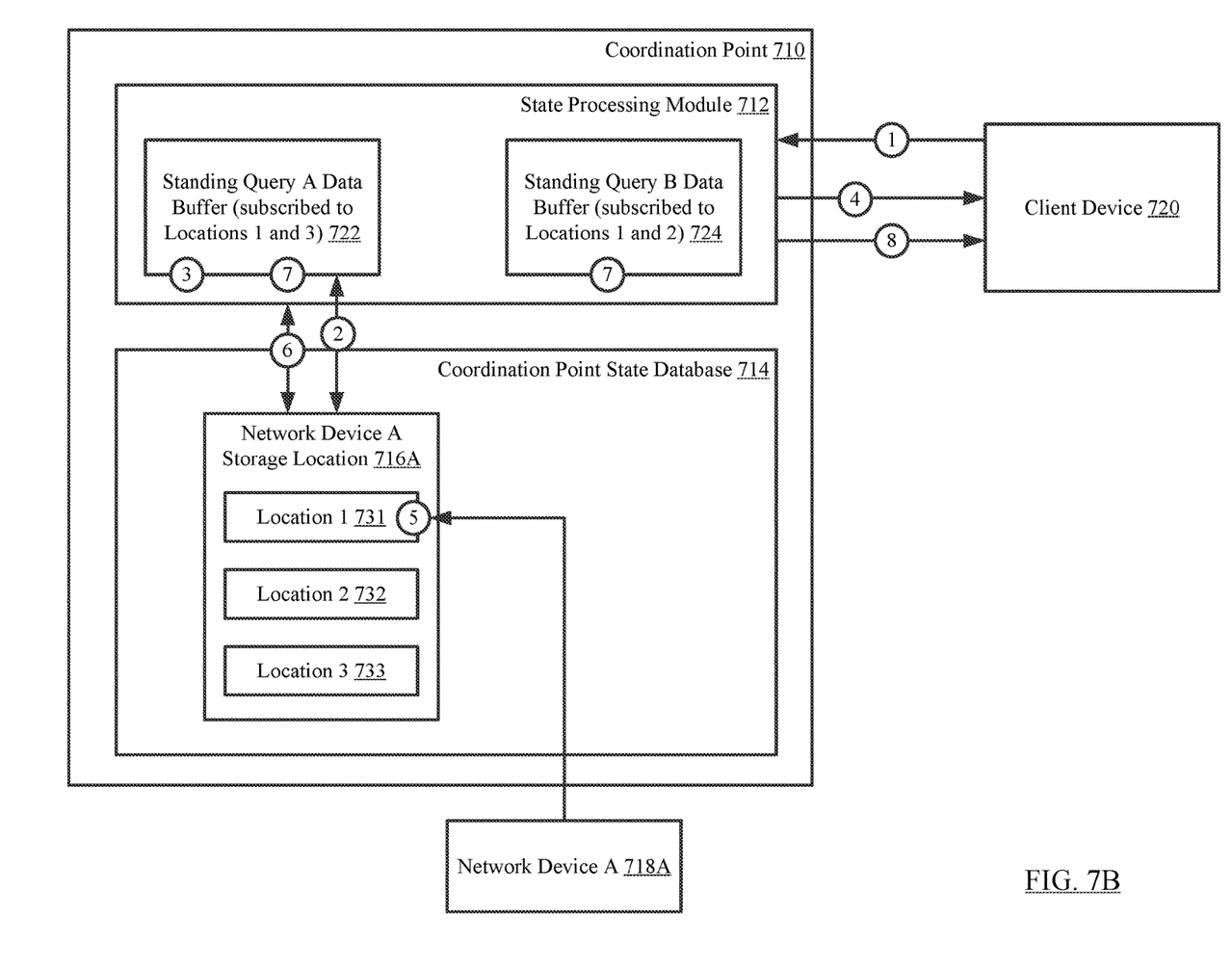

FIGS. 7A-7B shows an example in accordance with one or more embodiments disclosed herein. The example is not intended to limit the scope disclosed herein.

As shown in FIG. 7A, the coordination point (710) communicates with three network devices (network device A (718A), network device B (718B), and network device C (718C)). Specifically, the three network devices (718A, 718B, 718C) provide their respective state information. The respective state information is provided as a stream to the coordination point (710). The coordination point (710) obtains the streamed state information via incoming state modules (not shown). The streamed state information is stored from the incoming state modules to a coordination point state database (714) of the coordination point (710). The coordination point state database (714) may include three storage locations. Network device A storage location (716A) is the storage location that stores the memory usage information streamed from network device A (718A). Network device A storage location (716A) includes locations 1-3 (731, 732, 733). Network device B storage location (716B) is the storage location that stores memory usage information streamed from network device B (718B). Network device B storage location (716B) includes locations 4-6 (734, 735, 736). Network device C storage location (716C) is the storage location that stores memory usage information streamed from network device C (718C). Network device C storage location (716C) includes locations 7-9 (737, 738, 739).

Turning to FIG. 7B, a client device (720) sends a standing query to a state processing module (712) of the coordination point (710) [1]. The standing query specifies performing an average memory usage of network device A (718A) for the most recent 15-minute period. The new standing query may be a first notification. The state processing module (712), in response to the new standing query (hereinafter referred to as standing query A), performs the method of FIG. 6 to service the standing query A. Specifically, the state processing module (712) identifies the network device A storage location (716A) as the storage location for the memory usage information for network device A (718A).

Based on this identification, the state processing module (712) reserves a data buffer for standing query A and initiates a subscription associated with the storage locations for the memory usage information for network device A (718A) and the data buffer. In this example, the memory usage information is associated with locations 1 (731) and 3 (733) of the network device A storage location (716A). Once the data buffer is reserved, a copy of the data in locations 1 and 3 (731, 733) that meets the specified time window of being within the most recent 15 minutes is copied to standing query A data buffer (722) [2]. In this manner, the standing query A data buffer (722) includes a copy of a portion of the memory usage information of the network device A storage location (716A). The state processing module (712) further manages a second subscription to locations 1 and 2 (731, 732) for a second standing query (hereinafter referred to as standing query B). The subscription to locations 1 and 2 (731, 732) results in reservation of a standing query B data buffer (724). The standing query B data buffer (724) includes a reference to at least a portion of data obtained in standing query A data buffer (722). In addition, a data structure is updated to specify: (i) the mapping between location 1 (731) and standing query A and B, (ii) the mapping between location 2 (732) and standing query B, (iii) the mapping between location 3 (733) and standing query A, (iv) the mapping between standing query A buffer (722) and standing query A, and (v) the mapping between standing query B buffer (724) and standing query B.

Returning to standing query A, after reserving the standing query A data buffer (722), the state processing module (712) services standing query A using the standing query A data buffer (722) [3]. Specifically, the state processing module (712) calculates the average memory usage using the memory usage of the multiple entries of memory usage stored in the standing query A data buffer (722). The calculated average is provided to the client device (720) [4].

At a later point in time, network device A (718A) sends new state information for memory usage of network device A to the incoming state module (not shown). The incoming state module stores the new state information to the network device A stream storage information (716A) [5]. Specifically, the storage is in location 1 (731). Based on the update to location 1, the coordination point (710) receives a change notification. Because of the subscription that was previously initiated on location 1 (731) for the memory usage information for network device A (718A) and based on the mapping specified in the data structure discussed above, the state processing module stores the new data in standing query A data buffer (722) and delete any data that has expired outside of the most recent 15-minute time window to obtain an updated standing query A data buffer (722) [6]. Further, because standing query B (724) is also subscribed to location 1 (731), standing query B data buffer (724) is also updated using a new reference to the data in standing query A data buffer (722). Following the updates to the data buffers (722, 724), the state processing module (712) services standing query A and standing query B using the respected updated standing query data buffers (722, 724). The result of servicing standing query A is a new calculated average memory usage. The new calculated average memory usage is provided to the client device (720) [8]. While not shown in FIG. 7B, the result of servicing standing query B is provided to the respective client device.

END OF EXAMPLE

Figure 8:
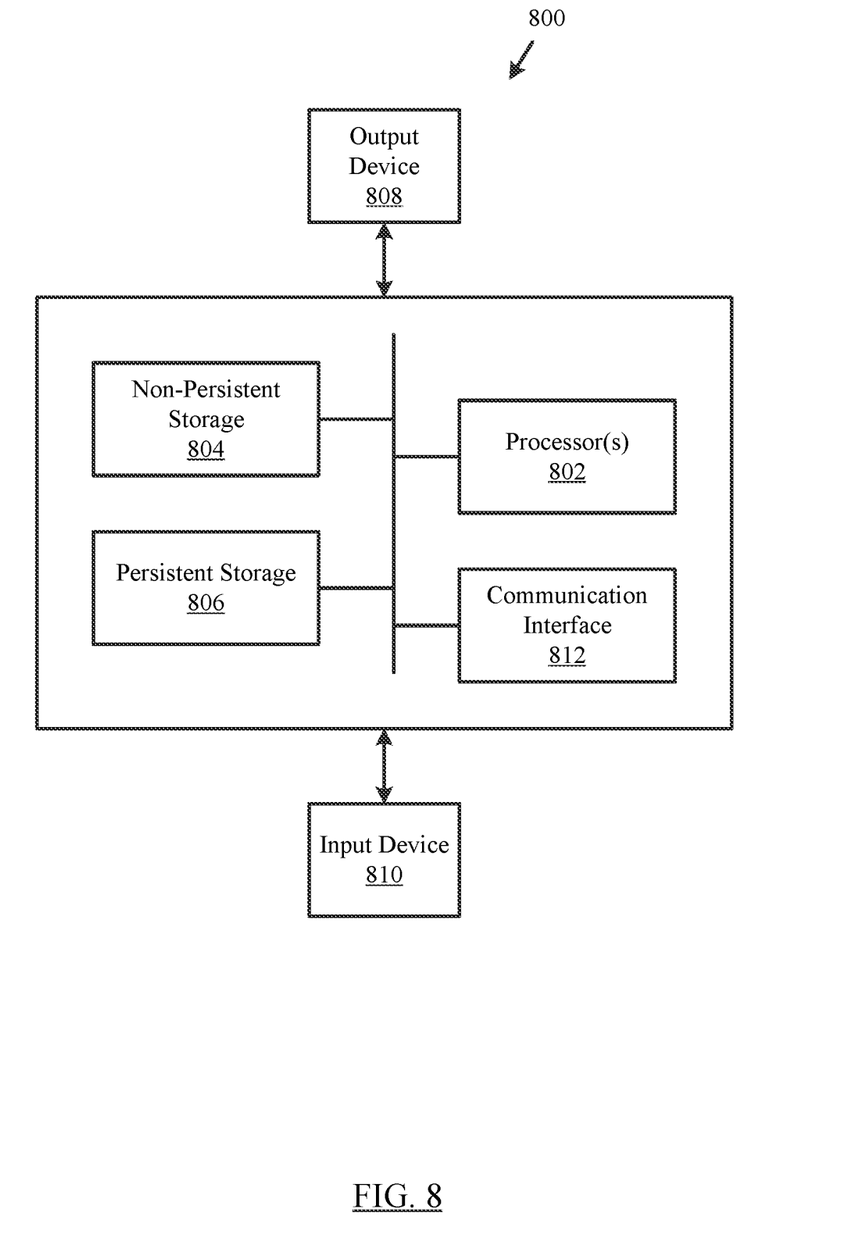
FIG. 8 shows a computing system in accordance with one or more embodiments disclosed herein.

Embodiments of the technology may be implemented on a computing system. Any combination of mobile, desktop, server, embedded, or other types of hardware may be used. For example, as shown in FIG. 8, the computing system (800) may include one or more processor(s) (802), non-persistent storage (804) (e.g., random access memory (RAM), cache memory, flash memory, etc.), persistent storage (806) (e.g., a hard disk, an optical drive such as a compact disk (CD) drive or digital versatile disk (DVD) drive, a flash memory stick, etc.), and numerous other elements and functionalities. The processor(s) (802) may be an integrated circuit for processing instructions. For example, the processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected via a communication interface (812) connected to a network (e.g., a local area network (LAN), a wide area network (WAN) such as the Internet, mobile network, or any other type of network). The input and output device(s) may be locally or remotely (e.g., via the communication interface (812)) connected to the processor(s) (802), non-persistent storage (804), and persistent storage (806). Many different types of computing systems exist, and the aforementioned input and output device(s) may take other forms.

Software instructions in the form of computer readable medium program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Specific embodiments disclosed herein have been described in detail with reference to the accompanying figures. Like elements in the various figures are denoted by like reference numerals for consistency.

In the above detailed description of embodiments disclosed herein, numerous specific details are set forth in order to provide a more thorough understanding disclosed herein. However, it should be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While the technology has been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for managing data, the method comprising:
    obtaining, by a state processing module in a coordination point, a notification specifying a standing query;
    in response to the notification:
        identifying a storage location in the coordination point associated with the standing query, wherein the storage location is configured to store state information of a network device configured to process network data in a network;
        initiating a subscription to the storage location;
        generating a data buffer for the standing query, wherein the data buffer is configured to store copies of data stored at the storage location that are used to service the standing query;
        generating a copy of data stored at the storage location;
        storing the copy of the data stored at the storage location in the data buffer; and
        servicing the standing query using the data buffer.

2. The method of claim 1, further comprising:
    obtaining, by the state processing module, a second notification for an update to the storage location; and
    in response to the second notification:
        updating the data buffer by storing a copy of data stored in the updated storage location in the data buffer;
        servicing the standing query using the updated data buffer.

3. The method of claim 1,
    wherein the standing query specifies a time window, and
    wherein the data is associated with timestamps that are within the time window.

4. The method of claim 1,
    wherein the coordination point comprises a database, wherein the database includes the storage location.

5. The method of claim 1 further comprising periodically receiving the state information from the network device.

6. The method of claim 1, wherein the state information comprises at least one of: information about services currently executing on the network device, versions of software executing on the network device, versions of firmware on the network device, hardware version information for hardware in the network device, and information about the current state of tables in the network device.

7. The method of claim 1, wherein servicing the standing query using the updated data buffer comprises:
    processing data in the data buffer to obtain a result based on the standing query; and
    transmitting the result to a client device associated with the standing query.

8. A non-transitory machine-readable medium storing a program executable by at least one processor of a computing device, the program comprising sets of instructions for:
    obtaining a notification for a standing query;
    in response to the notification:
        identifying a first storage location and a second storage location in a coordination point associated with the standing query, wherein the first and second storage locations are each configured to store state information of a network device configured to process network data in a network;
        generating a data buffer for the standing query, wherein the data buffer is configured to store copies of data stored at the first and second storage locations that are used to service the standing query;
        generating, based on the standing query, a copy of data stored in the first storage location and a copy of data stored in the second storage location;
        storing the copy of the data stored in the first storage location and the copy of data stored in the second storage location in the data buffer; and
        servicing the standing query using the updated data buffer.

9. The non-transitory machine-readable medium of claim 8, wherein the state processing module is further programmed to:
    obtain a second notification for an update to the first storage location; and
    in response to the second notification:
        updating the data buffer by storing a copy of data stored in the updated first storage location in the data buffer; and
        service the standing query using the updated data buffer.

10. The non-transitory machine-readable medium of claim 8,
    wherein the standing query specifies a time window, and
    wherein the data is associated with timestamps that are within the time window.

11. The non-transitory machine-readable medium of claim 8, wherein the coordination point comprises a database, wherein the database includes the first and second storage locations.

12. The non-transitory machine-readable medium of claim 8, wherein the program further comprises a set of instructions for periodically receiving the state information from the network device.

13. The non-transitory machine-readable medium of claim 8, wherein the program further comprises a set of instructions for periodically receiving the state information via a stream from the network device.

14. The non-transitory machine-readable medium of claim 8, wherein servicing the standing query using the updated data buffer comprises:
    processing data in the data buffer to obtain a result; and
    transmitting the result to a client device associated with the standing query.

15. A method for managing data, the method comprising:
    obtaining, by a state processing module, a notification for an update to a storage location of a coordination state database, wherein the notification is obtained via a stream of state information associated with a network device;
    in response to the notification:
        identifying a subscription associated with the storage location;
        storing, in response to the identifying, a copy of data stored in the storage location in a data buffer associated with the subscription and a standing query; and
        servicing the standing query using the updated data buffer.

16. The method of claim 15, further comprising:
    identifying a second subscription associated with the storage location;
    updating, in response to identifying the second subscription, a second data buffer associated with the second subscription to obtain an updated second data buffer, wherein the updating of the second data buffer is based on the notification, and wherein the second data buffer is associated with a second standing query; and
    servicing the second standing query using the updated second data buffer.

17. The method of claim 15, wherein the standing query specifies a time window, and wherein the data is associated with timestamps that are within the time window.

18. The method of claim 15, wherein the state information comprises at least one of: information about services currently executing on the network device, versions of software executing on the network device, versions of firmware on the network device, hardware version information for hardware in the network device, and information about the current state of tables in the network device.

19. The method of claim 15 further comprising periodically receiving the state information via the stream associated with the network device.

20. The method of claim 15, wherein servicing the standing query using the updated data buffer comprises:
    processing data in the data buffer to obtain a result; and
    transmitting the result to a client device associated with the standing query.

* * * * *